(12) United States Patent
Vyhlidal et al.

(10) Patent No.: US 12,614,895 B2
(45) Date of Patent: Apr. 28, 2026

(54) LOW VOLTAGE; MEDIUM VOLTAGE; OR HIGH VOLTAGE CABLE FIXATION SYSTEM

(71) Applicant: ABB Schweiz AG, Baden (CH)

(72) Inventors: Jan Vyhlidal, Strelice (CZ); Radovan Renda, Brno (CZ)

(73) Assignee: ABB Schweiz AG, Baden (CH)

( * ) Notice: Subject to any disclaimer, the term of this patent is extended or adjusted under 35 U.S.C. 154(b) by 207 days.

(21) Appl. No.: 18/495,860

(22) Filed: Oct. 27, 2023

(65) Prior Publication Data

US 2024/0146038 A1 May 2, 2024

(30) Foreign Application Priority Data

Oct. 28, 2022 (EP) ..................................... 22204448

(51) Int. Cl.
| | |
|---|---|
| *H02B 1/30* | (2006.01) |
| *H02G 3/32* | (2006.01) |
| *H02B 13/035* | (2006.01) |

(52) U.S. Cl.
CPC ............... *H02B 1/305* (2013.01); *H02G 3/32* (2013.01); *H02B 13/035* (2013.01)

(58) Field of Classification Search
CPC ............................... H05K 7/1491; H02G 3/32
See application file for complete search history.

(56) References Cited

U.S. PATENT DOCUMENTS

| | | | | | |
|---|---|---|---|---|---|
| 7,935,412 | B2 * | 5/2011 | Laporte | ................. | B65D 63/10 |
| | | | | | 428/220 |
| 8,387,215 | B2 * | 3/2013 | Koncelik, Jr. | ..... | B65D 63/1018 |
| | | | | | 24/16 PB |
| 9,093,830 | B2 * | 7/2015 | Krieg | ..................... | F16G 11/06 |

(Continued)

FOREIGN PATENT DOCUMENTS

| | | |
|---|---|---|
| DE | 19604219 C1 | 6/1997 |
| DE | 29823871 U1 | 1/2000 |

(Continued)

OTHER PUBLICATIONS

Difvan, "Screw Mount Cable Ties," product page downloaded from the Internet on Apr. 19, 2023, at https://web.archive.org/web/20220120170332/https://www.difvan.com/screw-mount-cable-ties/, 9 pp. (Jan. 20, 2022).

(Continued)

*Primary Examiner* — Mukundbhai G Patel
(74) *Attorney, Agent, or Firm* — Fitch Even Tabin & Flannery LLP

(57) ABSTRACT

A cable fixation system includes a cable strip and a cable rack. The cable rack is configured to be mounted to a cable compartment of a low voltage, medium voltage, or high voltage switchgear. The cable rack comprises at least one hole. A first end of the cable strip is configured to connect to a second end of the cable strip. The cable strip is configured to fix or clamp a cable of the low voltage, medium voltage, or high voltage switchgear, and wherein to fix or clamp the cable: the cable strip passes through one or more holes of the at least one hole of the cable rack, the cable strip loops round at least a part of the cable, and the first end of the cable strip is connected to the second end of the cable strip.

12 Claims, 8 Drawing Sheets

(56) References Cited

U.S. PATENT DOCUMENTS

| | | | |
|---|---|---|---|
| 2010/0132168 A1* | 6/2010 | Coffland | F16B 43/00 |
| | | | 24/517 |
| 2014/0304951 A1* | 10/2014 | Dodd | H02G 3/26 |
| | | | 24/136 B |
| 2020/0287369 A1* | 9/2020 | Kaun | H02G 3/0456 |

FOREIGN PATENT DOCUMENTS

| | | | |
|---|---|---|---|
| JP | 59-114707 U | 8/1984 | |
| WO | WO-9838096 A1 * | 9/1998 | B65D 63/1063 |

OTHER PUBLICATIONS

European Patent Office, Extended European Search Report in European Patent Application No. 22204448.9, 12 pp. (May 2, 2023).

* cited by examiner

- PRIOR ART -

- PRIOR ART -

- PRIOR ART -

120/122

LOW VOLTAGE; MEDIUM VOLTAGE; OR HIGH VOLTAGE CABLE FIXATION SYSTEM

CROSS-REFERENCE TO RELATED APPLICATIONS

The instant application claims priority to European Patent Application No. 22204448.9, filed Oct. 28, 2022 which is incorporated herein in its entirety by reference.

FIELD OF THE DISCLOSURE

The present disclosure generally relates to a low voltage, medium voltage or high voltage fixation system for a low voltage, medium voltage or high voltage switchgear.

BACKGROUND OF THE INVENTION

Incoming and outgoing cables to low, medium, and high voltage switchgear with rated currents exceeding 100A are required to be fixed in position.

Currently cable clamps as shown in FIG. 1 are utilized, providing mechanical fixation of the low voltage, medium voltage or high voltage cable to the frame of the switchgear.

These clamps are usually arranged in a set fixed in the cable compartment of the low voltage, medium voltage or high voltage switchgear, see FIG. 2 that shows the fixation of cable clamps in a cable compartment of a medium voltage switchgear. Such clamps are usually arranged in a 3-phase configuration with at least one cable and cable connection/clamp per phase. The same cable clamp arrangement is also used in the case of the use of a single 3-phase cable, but in this case, a bigger cable clamp is needed to accommodate a bigger diameter of the 3-phase cable.

FIG. 3 shows assembly of the cables in the cable compartment of a medium voltage switchgear using the known cable clamps.

However, the present cable clamp consists of several small parts that need to be assembled, the assembly of the cable clamp requires specific tools, the assembly takes time and costs money and requires significant amounts of raw material, and the cable clamp is expensive.

BRIEF SUMMARY OF THE INVENTION

Therefore, it would be advantageous to have an improved technique to fix or clamp cables in a compartment of a low voltage, medium voltage or high voltage switchgear, such as an air or gas insulated switchgear. It is to be noted that the fixation system is described with respect to a medium voltage air or gas insulated switchgear, but finds utility also for low voltage and high voltage switchgear.

In an aspect, there is provided a low voltage, medium voltage or high voltage cable fixation system, comprising:
  a cable strip; and
  a cable rack.

The cable rack is configured to be mounted to a cable compartment of a low voltage, medium voltage, or high voltage switchgear. The cable rack comprises at least one hole. A first end of the cable strip is configured to connect to a second end of the cable strip. The cable strip is configured to fix or clamp a cable of the low voltage, medium voltage, or high voltage switchgear. To fix or clamp the cable the following applies: the cable strip passes through one or more holes of the at least one hole of the cable rack, the cable strip loops round at least a part of the cable, and the first end of the cable strip is connected to the second end of the cable strip.

BRIEF DESCRIPTION OF THE SEVERAL VIEWS OF THE DRAWING(S)

DETAILED DESCRIPTION OF THE INVENTION

Figure 1:
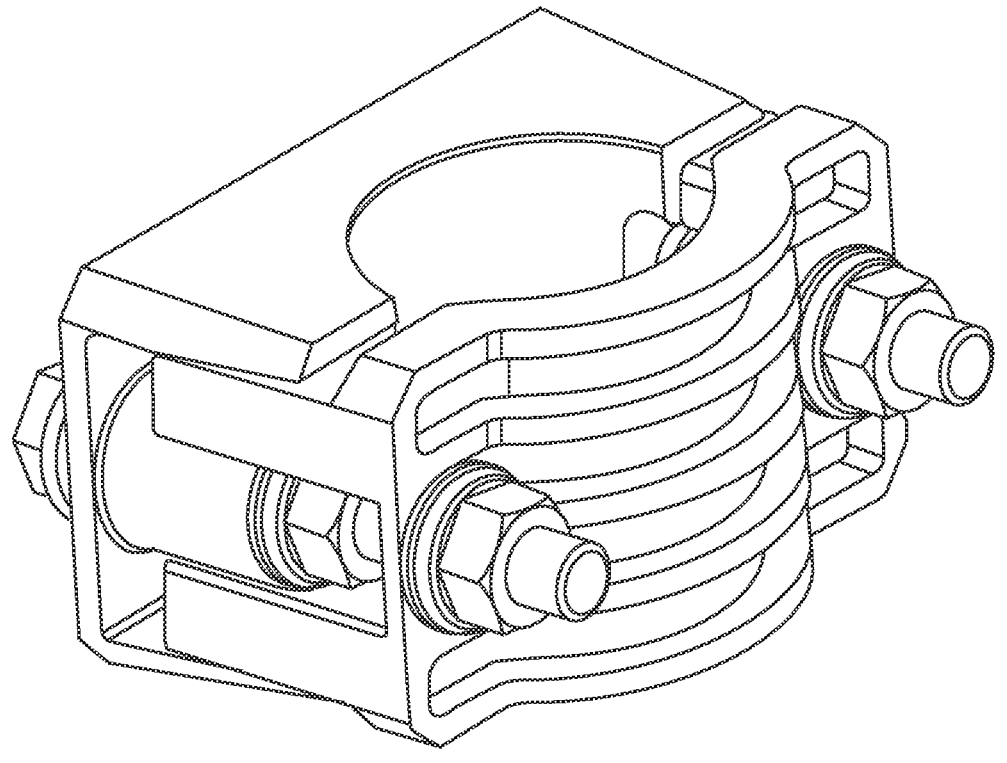
FIG. 1 shows a standard known cable clamp.
Figure 2:
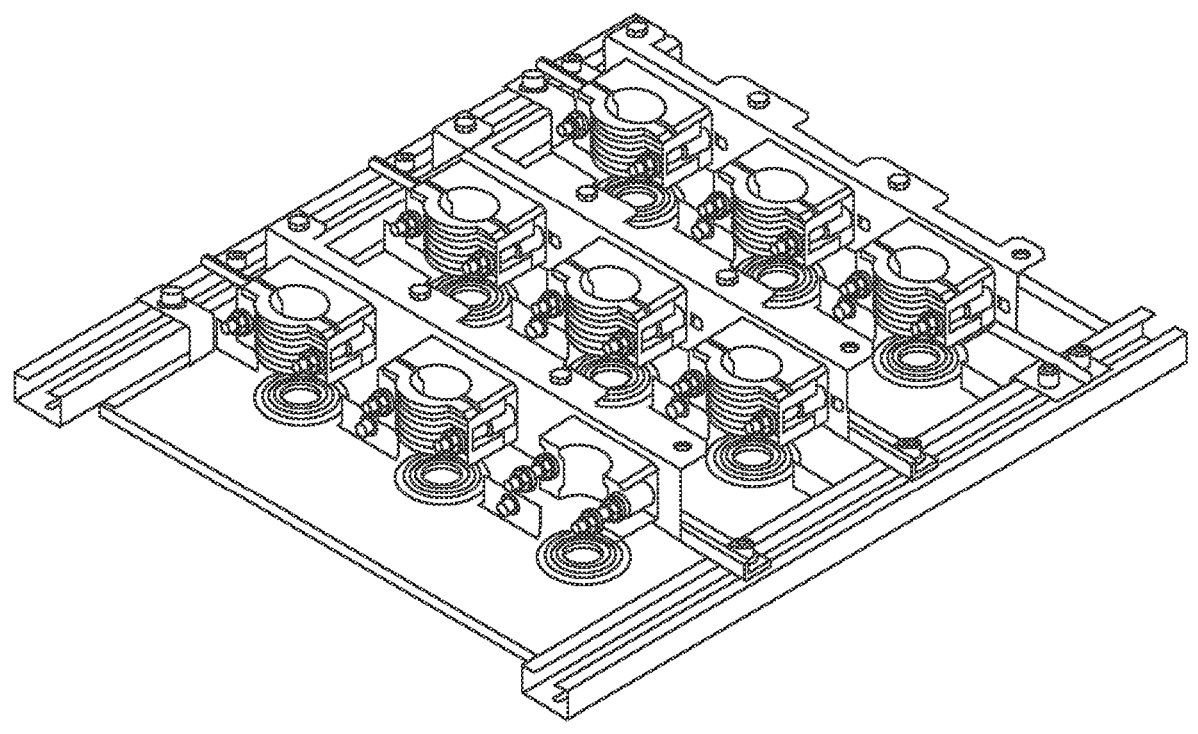
FIG. 2 shows standard known cable clamps arranged for the fixation of cables of a medium voltage switchgear.
Figure 3:
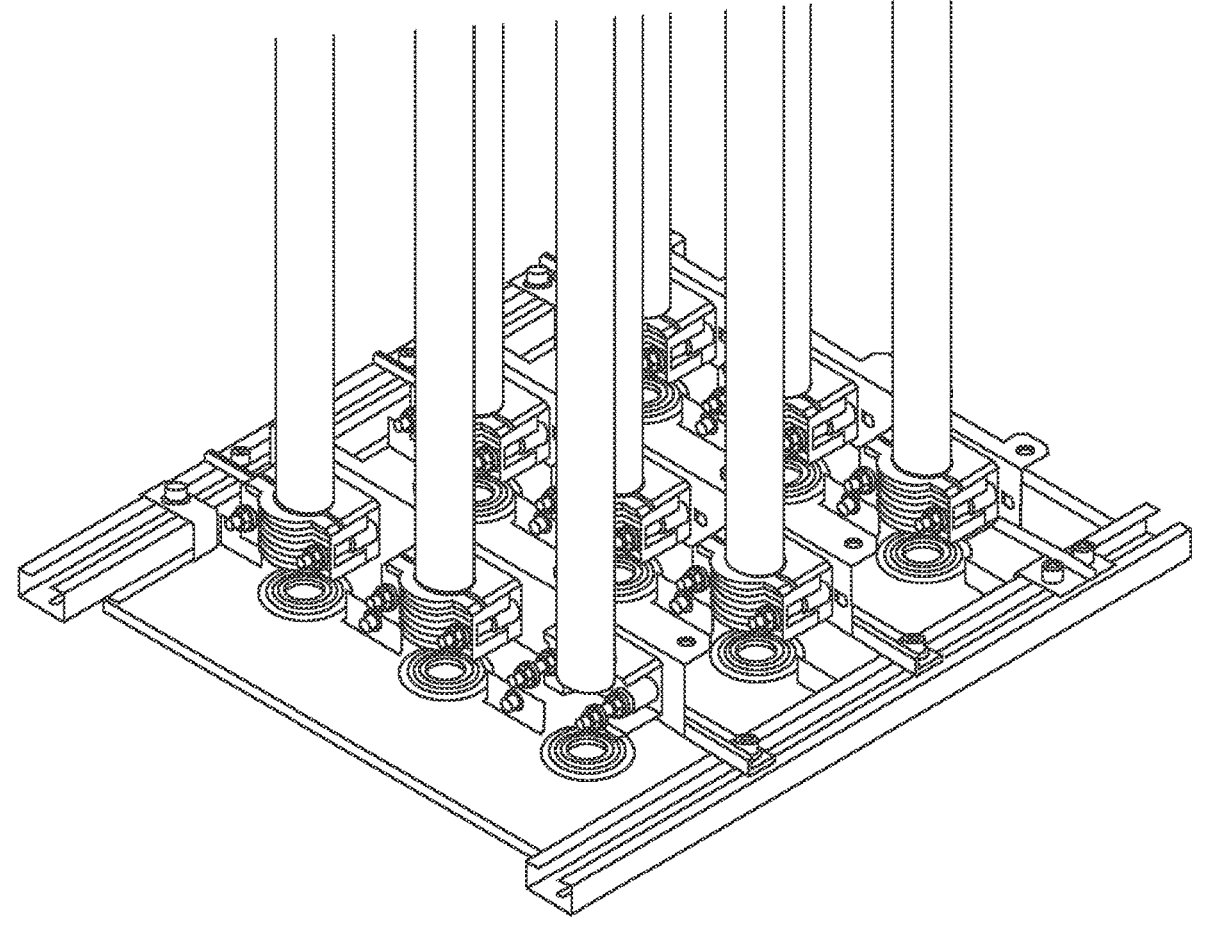
FIG. 3 shows standard known cable clamps fixing cables of a medium voltage switchgear.

The new fixation system, in different embodiments, is now described in detail where reference is made to FIGS. 4A-8B.

An example of a low voltage, medium voltage or high voltage cable fixation system comprises a cable strip 100, and a cable rack 102. The cable rack 102 is configured to be mounted to a cable compartment 104 of a low voltage, medium voltage, or high voltage switchgear 106. The cable rack comprises at least one hole 108. A first end 110 of the cable strip 100 is configured to connect to a second end 112 of the cable strip 100. The cable strip 100 is configured to fix or clamp a cable 114 of the low voltage, medium voltage, or high voltage switchgear 106. To fix or clamp the cable the following applies:
  the cable strip 100 passes through one or more holes 108 of the at least one hole of the cable rack 102,
  the cable strip 100 loops round at least a part of the cable 114, and
  the first end 110 of the cable strip 100 is connected to the second end 112 of the cable strip 100.

Figure 5A:
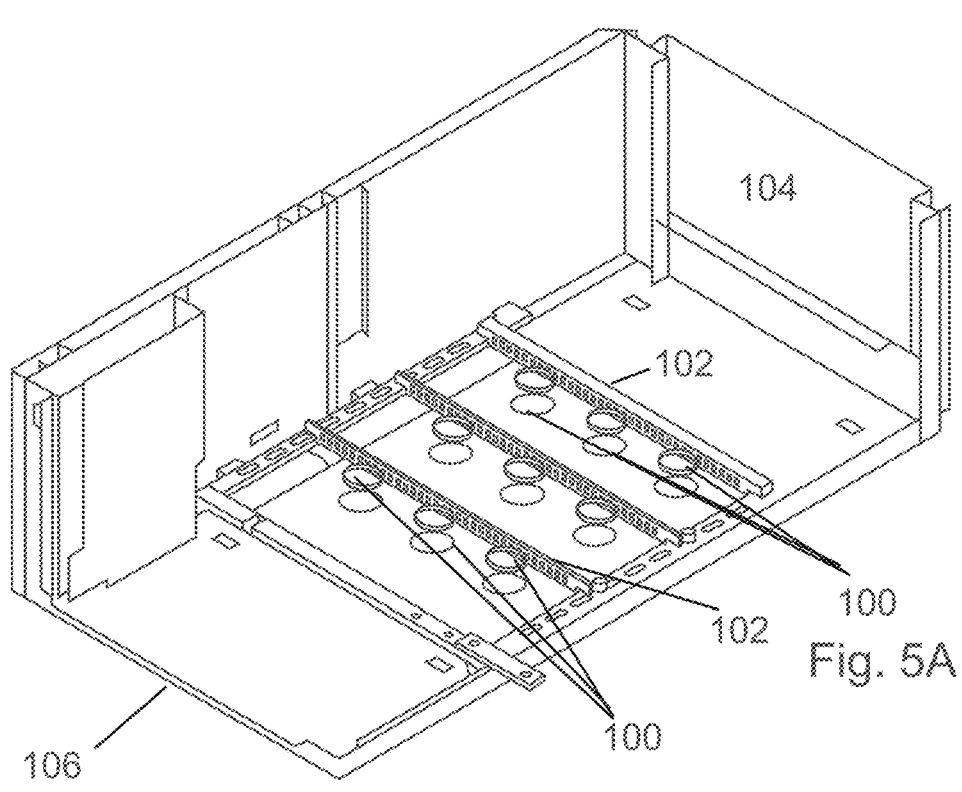
FIGS. 5A and 5B show different perspectives of an exemplary embodiment of the new fixation system within a cable compartment of a medium voltage switchgear.
Figure 5B:
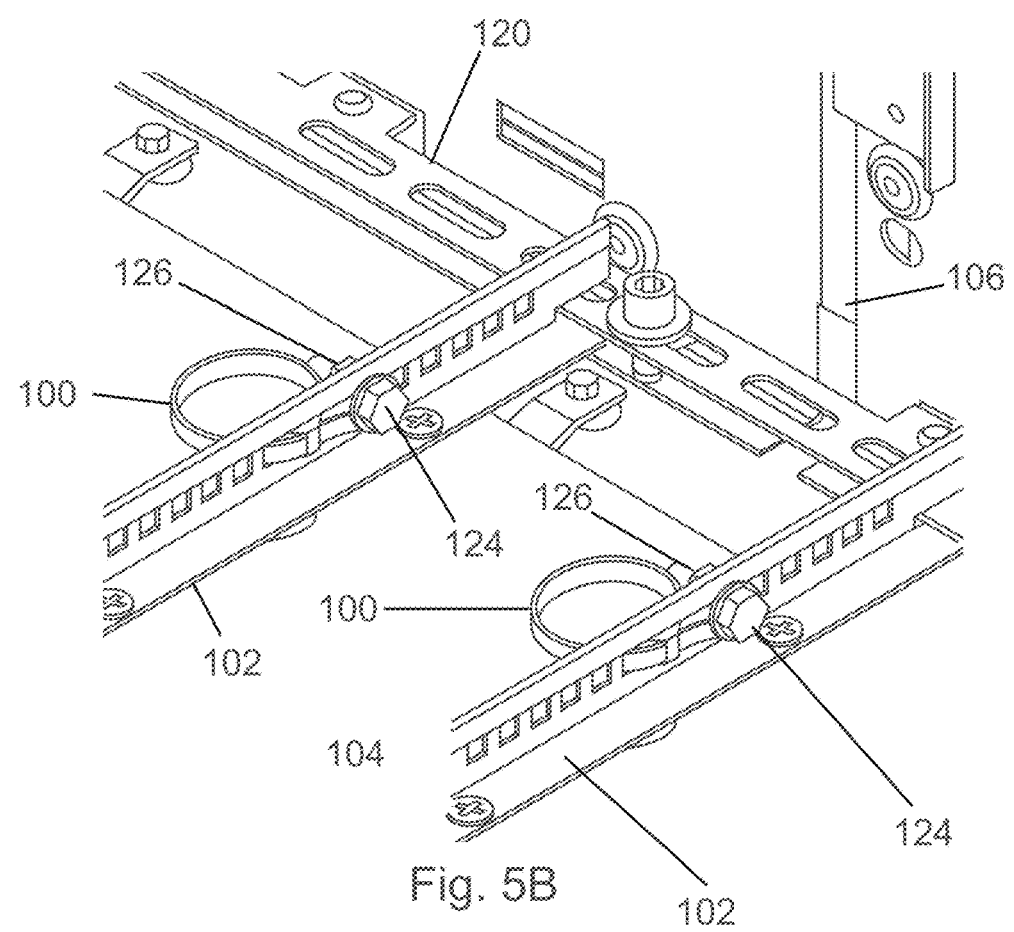

As shown for example in FIGS. 5A and 5B, the cable rack 102 can be mounted for example to the base of the compartment 104 of the switchgear 106. There can be mounting brackets, or mounting holes, provided on the cable rack 102 in order to secure the cable rack to compartment 104.

As shown for example in FIGS. 5A, 5B, 6, 8A and 8B, the cable rack 102 can have a number of holes 108 along its length, but it could just by one hole 108, and this hole or holes 108, utilized when connecting cable strip 100 to the cable rack 102.

Figures 4A, 4B, 4C:
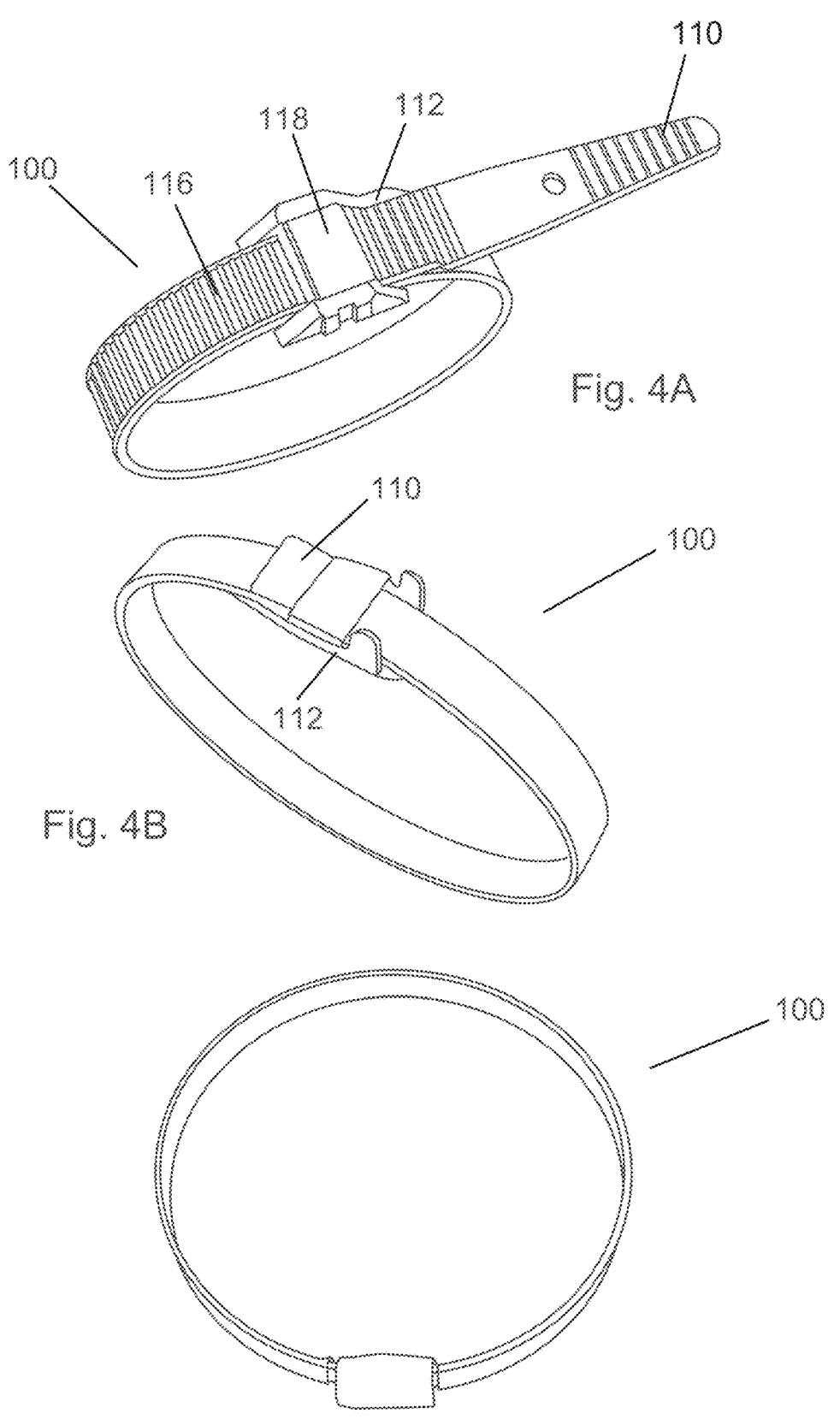
FIGS. 4A, 4B and 4C show examples of cable strips of the new cable fixation system in accordance with the disclosure.

Examples of cable strips are shown in FIGS. 4A and 4B, the cable strips 100 as shown in FIGS. 5A, 5B, 6, 8A and 8B. As shown in FIG. 4A, the two ends 110, 112 of the cable strip 100 have connection means enabling the two ends 110, 112 of the cable strip 100 to be connected to each other. For example, a first end 110 of the cable strip 100 can slide through a second end 112 of the cable strip 100 and ridges 116 on the first end 110 of the cable strip click past the ratchet like system 118 at the second end 112 to enable the first end to be pulled through the second end but not pulled back. However, the second end 112 can have a clasp like system that clamps down on the first end 110 of the cable strip 100. Other connection means possible.

Thus, the cable strip 100 compulsory one hole 108 of the cable rack 102, around a cable 114 that is to be fixed or clamped and two ends 110, 112 of the cable strip 100 can be connected to each other, and the first end 110 of the cable strip 100 can for example by pulled tight through the second end 112 of the cable strip 100 to tighten the cable strip 100 around the cable 114. However, to provide for fixing or clamping of the cable 114 via a cable strip 100 that is oriented parallel to the cable rack 102, and provide more security from the cable 114 moving laterally, the cable strip 100 can go through one hole 108 of the cable rack 102, around the cable 114, back through a second hole 108 laterally spaced from the first hole 108, and then the two ends 110, 112 of the cable strip 100 can be connected to the other.

In this manner, new cable fixing or clamping mechanism is provided via the new cable fixation system in the form of cable rack at cable strip, that facilitates clamping the cable easily and efficiently, and secures the cable from moving even when short-circuit currents of an example 100A and greater pass through the cable.

In an example, the cable rack comprises a plurality of holes, and wherein to fix or clamp the cable: the cable strip passes through two holes of the plurality of holes of the cable rack.

In an example, the cable strip has a mechanical strength of 1 kN or greater than 1 kN.

In an example, the cable strip comprises thermoset, thermoplastic, or a rubber material.

In an example, the cable strip comprises a metallic material.

In an example, the cable strip comprises a plurality of layers, and wherein at least two of the layers comprise different materials.

In an example, the cable strip comprises a layer of one material with particles of a second material.

In an example, the cable strip is UV resistant and/or is flame retardant.

In an example, the fixation system comprises a common rail 120. The common rail 120 is configured to be directly connected to a cable compartment 104, and the cable rack 102 and common rail 120 are configured such that the cable rack 102 can be connected to the common rail 120 to mount the cable rack 102 to the cable compartment 104.

In an example, the fixation system comprises a second common rail 122. The second common rail 122 is configured to be directly connected to a cable compartment 104, and the cable rack 102 and second common rail 122 are configured such that the cable rack 102 can be connected at one end to the first common rail 120 and connected at the opposite end to the second common rail 122 to mount the cable rack to the cable compartment.

Figure 7:
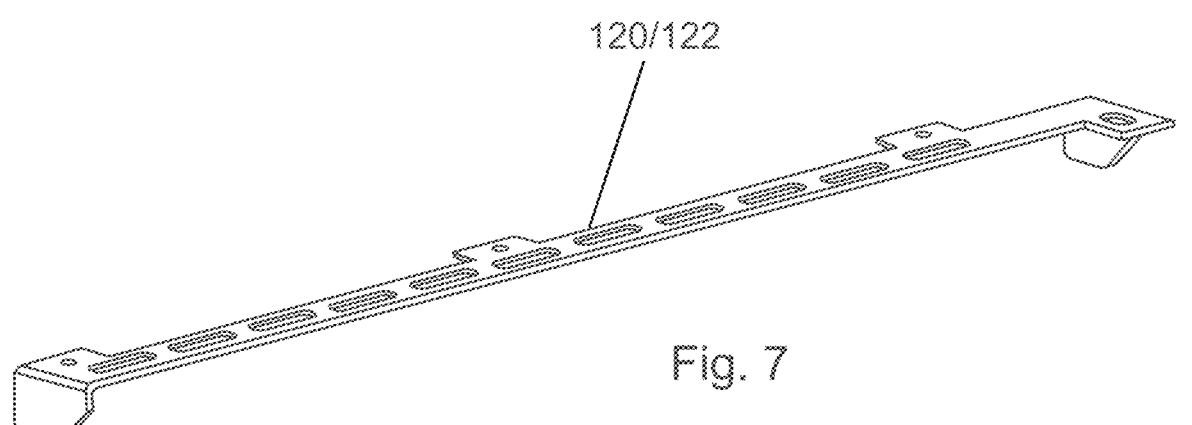
FIG. 7 shows an example of a cable rack of the new fixation system.
Figures 8A, 8B:
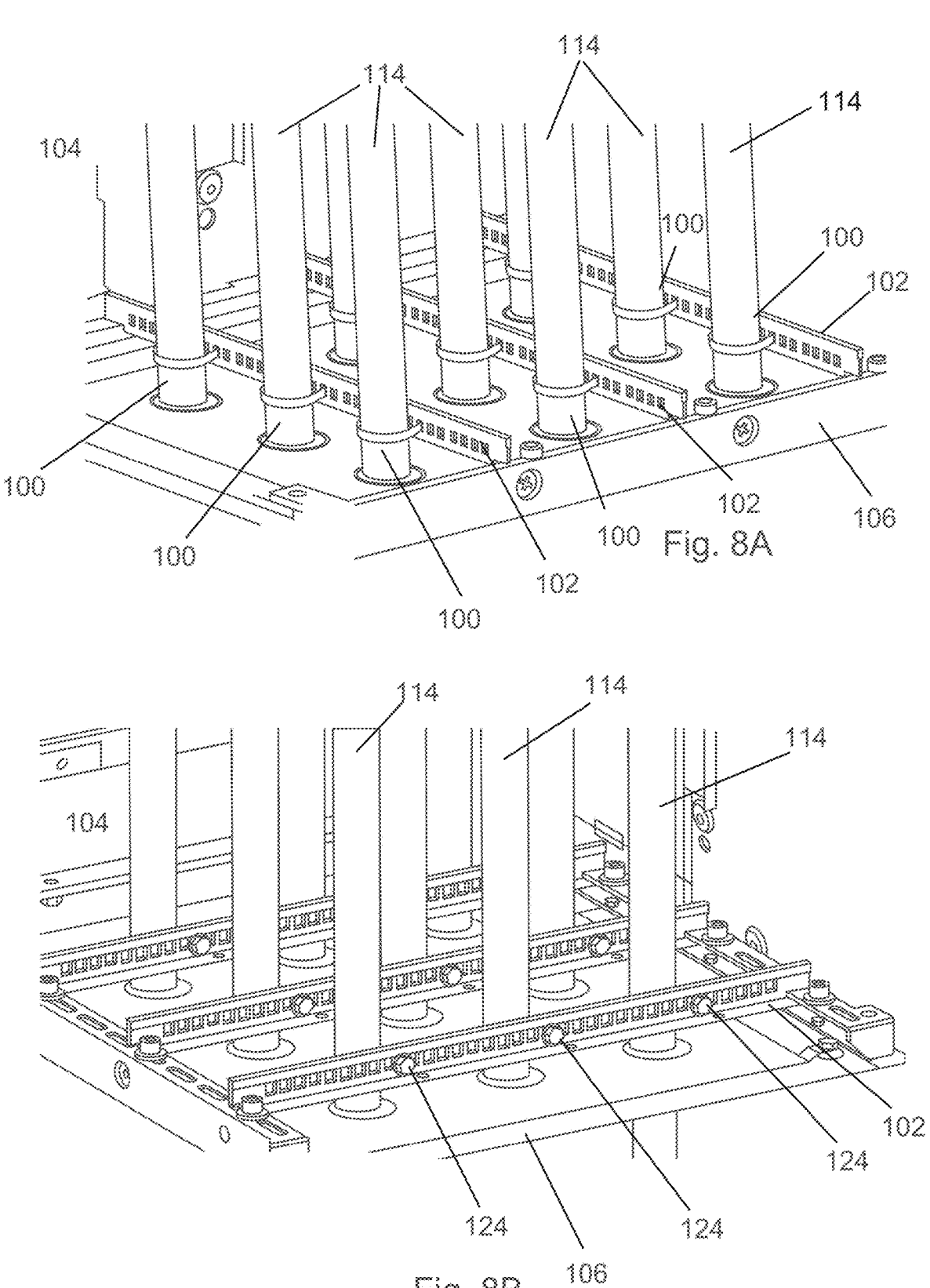
FIGS. 8A and 8B show three new fixation systems placed adjacent one another, where each is fixing or clamping three cables of phases of a 3-phase system.

Such a common rail in shown in FIG. 7, with cable racks shown connected to common rails in FIGS. 5A, 5B, 8A and 8B, where the common rails 120, 122 are connected to the base of the cable compartment 104.

An example of a low voltage, medium voltage or high voltage cable fixation system comprises a cable strip 100, and a cable rack 102. The cable rack 102 is configured to be mounted to a cable compartment 104 of a low voltage, medium voltage, or high voltage switchgear 106. The cable rack 102 comprises a plurality of holes 108. A first end 110 of the cable strip 100 is configured to connect to the cable rack 102 via a hole 108 of the plurality of holes 108 of the cable rack 102. A second end 112 of the cable strip 100 is configured to connect to the cable rack 102 via a hole 108 of the plurality of holes 108 of the cable rack 102. The cable strip 100 is configured to fix or clamp a cable 114 of the low voltage, medium voltage, or high voltage switchgear 106. To fix or clamp the cable 114 the following applies:

the first end 110 of the cable strip 100 is connected to the cable rack 102 via a first hole 108 of the plurality of holes 108 of the cable rack 102, the second end 112 of the cable strip 100 is connected to the cable rack 102 via a second hole 108 of the plurality of holes 108 of the cable rack 102, and the cable strip 100 loops round at least a part of the cable 114.

In an example, the first end of the cable strip is connected to the cable rack via a bolt or screw through the first hole of the plurality of holes of the cable rack. The second end of the cable strip is connected to the cable rack via a bolt or screw through the second hole of the plurality of holes of the cable rack.

Thus, the cable rack is equivalent to that described for the first example above, except that it has a plurality of holes via which the cable strips connected to the cable rack to fix or clamp the cable. However, in this example one end of the cable strip is bolted or screwed to the cable rack at one location via a first hole, and the other end of the cable strip is bolted or screwed to the cable rack location via signal, and the cable strip loops around the cable and fixes or clamps it.

In an example, the first end 110 of the cable strip 100 is connected to the cable rack 102 via a bolt or screw 124 through the first hole 108 of the plurality of holes 108 of the cable rack 100 and wherein the second end 112 of the cable strip 100 is connected to the cable rack 102 via the bolt or screw 124 through the first hole 108 of the plurality of holes 108 of the cable rack 102.

Thus, cable strip 100 loops from the cable 114 and one end passes through one hole 108 in the cable rack 102, along the back of the cable rack 102 opposite to the cable 114 is located, to location of the second hole 108 in the cable rack 102. At this location a bolt or screw 124 can fix this end of the cable strip 100 to the cable rack 102 and also fix the other end of the cable strip 100 to the cable rack 102. This is shown for example in FIG. 6

In an example, the first hole of the plurality of holes of the cable rack is threaded.

In an example, the second hole of the plurality of holes of the cable rack is threaded.

In an example, the first end of the cable strip is connected to the cable rack via the bolt through the first hole of the plurality of holes of the cable rack from one side and a nut from the other side, and wherein the second end of the cable strip is connected to the cable rack via the bolt or screw through the second hole of the plurality of holes of the cable rack from one side and a nut from the other side.

The use of nut 126 and bolt 124 securement provides for secure fixing of the ends 110, 112 of the cable strip 100 to the cable rack 102.

In an example, the first end 110 of the cable strip 100 is connected to the cable rack 102 via the bolt 124 through the first hole 108 of the plurality of holes 108 of the cable rack 102 from one side and a nut 126 from the other side and wherein the second end 112 of the cable strip 100 is connected to the cable rack 102 via the bolt or screw 124 through the first hole 108 of the plurality of holes 108 of the cable rack 102 from one side and the nut 126 from the other side.

The use of nut 126 and bolt 124 securement provides for secure fixing of the ends 110, 112 of the cable strip 100 to the cable rack 102 is a location. The nut and bolt 124, 126 securement of the cable strip 100 to the cable rack 102, with the cable strip 100 able to loop around the cable 114, is shown for example in FIG. 5.

In an example, the cable strip has a mechanical strength of 1 kN or greater than 1 kN.

In an example, the cable strip comprises thermoset, thermoplastic, or a rubber material.

In an example, the cable strip comprises a metallic material.

In an example, the cable strip comprises a plurality of layers, and wherein at least two of the layers comprise different materials.

In an example, the cable strip comprises a layer of one material with particles of a second material.

In an example, the cable strip is UV resistant and/or is flame retardant.

In an example, the fixation system comprises a common rail 120. The common rail 120 is configured to be directly connected to a cable compartment 104, and the cable rack 102 and common rail 120 are configured such that the cable rack 102 can be connected to the common rail 120 to mount the cable rack 102 to the cable compartment 104.

In an example, the fixation system comprises a second common rail 122. The second common rail 122 is configured to be directly connected to a cable compartment 104, and the cable rack 102 and second common rail 122 are configured such that the cable rack 102 can be connected at one end to the first common rail 120 and connected at the opposite end to the second common rail 122 to mount the cable rack 102 to the cable compartment 104.

The cable fixation system is now described in further specific detail, where reference is again made to FIGS. 4A and 8B.

The new cable strips 100 of the new fixation system are shown in FIGS. 4A and 4B. These are suitable for cable fixation in low/medium/high voltage switchgear 106 to fix cables 114 with high current capacity (exceeding 100A short-circuit current and resulting mechanical forces) due to their mechanical strength and materials used.

Such cable strips 100 are easy to fix in the cable compartment 104 of the switchgear 106, and examples that connect one end to the other can be fixed to the cable rack 102 without any tools and are extremely fast to assemble. In case someone needs to release the strip, a tool can be used. Some of the cable strips 100 are also fixed to the cable rack 102 involving the use of for example a nut and bolt 124, 126 connection, and appropriate simple tooling is then required.

Features of the cable strips are:

Sufficient mechanical strength (>1 kN)

Material should be at least partly:

UV resistant

Flame retardant

Should not damage cable insulation (but can have additional parts to avoid sharp edges being exposed to the cable insulation)

Can be made out of thermoset, thermoplast or rubber material

Can be made also out of at least partly metallic material with or without additional layers or particles of another material Strip can form at least partially the loop around the cable and may consist of one or more parts The strip can be used with two locking mechanisms (one on each side)

Sufficient mechanical strength for the cable strip is required in order to survive the mechanical forces coming from cable installation and its weight as well as additional mechanical forces during short-circuit current situations, such as during testing.

The cable strips 100 work alongside cable racks 102 that are lead to a modification of the switchgear cable compartment 104, to enable to fix cable racks 102 to the base of the switchgear 106 for example, to which cable strips 100 can be fixed, as shown in FIG. 5A.

As shown in FIGS. 5A and 5B, at least one cable rack 102 (in the case of single cable connected per phase) is used, but there could be three cable racks 102 utilized. A cable rack 102 with three cable strips 100 is shown in FIG. 6, that provides for modular assembly.

Figure 6:
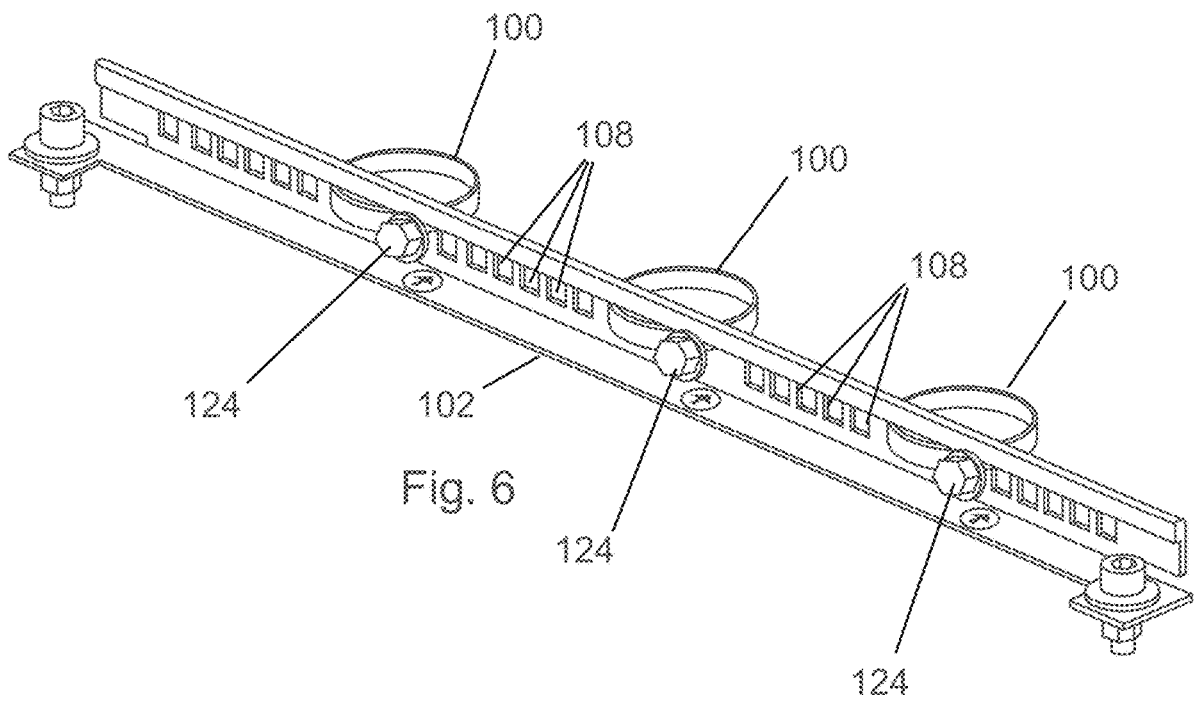
FIG. 6 shows an example of the new fixation system in accordance with the disclosure.

As shown in FIG. 6 the cable rack 102 has perforations or holes 108 that enables the cables strips 100 to be used to fix or clamp cables. An advantage of the cable rack 102 design lies in several possibilities to place the cable strip 100, due to multiple perforations that enables higher flexibility in location of required fixation.

There can be only one cable strip 100 used (single stripe for 3-phase cable) or three stripes (for the case with 3 single-phase cables). The cable rack 102 has sufficient mechanical strength and should also avoid mechanical damage to the cable strips 100 (thus decreasing mechanical strength of the stripe), for example by not having sharp edges.

The cable rack 102 can be made from an electrically conductive material or an insulated material in the situation where the earthing is done by other means.

Furthermore, in order to provide even higher level of flexibility in placement of the cable 114 within a cable compartment 104, the cable rack 102 can be in the form of a in effect a common rail 120, see FIG. 7, to which the cable rack 102 or racks are to be fixed.

This common rail 120 also has some perforations, that enables flexibility in placement of the cable rack 102 or racks within cable compartment of the switchgear 106.

An example of the full assembly of the cable racks 102 to the common rail 120 is shown in FIGS. 5A, 5B, 8A and 8B.

In an example, the cable rack 102 comprises a plurality of holes 108, and to fix or clamp the cable 114, the cable strip 100 passes through two holes 108 of the plurality of holes 108 of the cable rack 102.

In an example, the cable strip has a mechanical strength of 1 kN or greater than 1 kN.

In an example, the cable strip comprises thermoset, thermoplastic, or a rubber material.

In an example, the cable strip comprises a metallic material.

In an example, the cable strip comprises a plurality of layers, and at least two of the layers comprise different materials.

In an example, the cable strip comprises a layer of one material with particles of a second material.

In an example, the cable strip is UV resistant and/or is flame retardant.

In an aspect, there is provided a low voltage, medium voltage or high voltage cable fixation system, comprising:

a cable strip; and a cable rack.

The cable rack is configured to be mounted to a cable compartment of a low voltage, medium voltage, or high voltage switchgear. The cable rack comprises a plurality of holes. A first end of the cable strip is configured to connect to the cable rack via a hole of the plurality of holes of the cable rack. A second end of the cable strip is configured to connect to the cable rack via a hole of the plurality of holes of the cable rack. The cable strip is configured to fix or clamp a cable of the low voltage, medium voltage, or high voltage switchgear. To fix or clamp the cable the following applies:

the first end of the cable strip is connected to the cable rack via a first hole of the plurality of holes of the cable rack, the second end of the cable strip is connected to the cable rack via a second hole of the plurality of holes of the cable rack, and the cable strip loops round at least a part of the cable.

In an example, the first end of the cable strip is connected to the cable rack via a bolt or screw through the first hole of the plurality of holes of the cable rack, and the second end of the cable strip is connected to the cable rack via a bolt or screw through the second hole of the plurality of holes of the cable rack.

In an example, the first end of the cable strip is connected to the cable rack via a bolt or screw through the first hole of the plurality of holes of the cable rack and wherein the second end of the cable strip is connected to the cable rack via the bolt or screw through the first hole of the plurality of holes of the cable rack.

In an example, the first hole of the plurality of holes of the cable rack is threaded, and the second hole of the plurality of holes of the cable rack is threaded.

In an example, the first end of the cable strip is connected to the cable rack via the bolt through the first hole of the plurality of holes of the cable rack from one side and a nut from the other side. The second end of the cable strip is connected to the cable rack via the bolt or screw through the second hole of the plurality of holes of the cable rack from one side and a nut from the other side.

In an example, the first end of the cable strip is connected to the cable rack via the bolt through the first hole of the plurality of holes of the cable rack from one side and a nut from the other side. The second end of the cable strip is connected to the cable rack via the bolt or screw through the first hole of the plurality of holes of the cable rack from one side and the nut from the other side.

In an example, the cable strip has a mechanical strength of 1 kN or greater than 1 kN.

In an example, the cable strip comprises thermoset, thermoplastic, or a rubber material.

In an example, the cable strip comprises a metallic material.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A low voltage, medium voltage or high voltage cable fixation system, comprising:

a cable strip; and a cable rack;

wherein the cable rack is configured to be mounted to a cable compartment of a low voltage, medium voltage, or high voltage switchgear;

wherein the cable rack comprises at least one hole;

wherein a first end of the cable strip is configured to connect to a second end of the cable strip;

wherein the cable strip is configured to fix or clamp a cable of the low voltage, medium voltage, or high voltage switchgear; and wherein to fix or clamp the cable: the cable strip passes through one or more holes of the at least one hole of the cable rack, the cable strip loops round at least a part of the cable, and the first end of the cable strip is connected to the second end of the cable strip, wherein the cable strip comprises a plurality of layers and wherein at least two of the layer comprise different materials, wherein at least one layer comprises a thermoset, and a thermoplastic, or a rubber material and at least one layer comprise a metallic material.

2. The cable fixation system according to claim 1, wherein the cable rack comprises a plurality of holes, and wherein to fix or clamp the cable: the cable strip passes through two holes of the plurality of holes of the cable rack.

3. The cable fixation system according to claim 1, wherein the cable strip has a mechanical strength of at least 1 kN.

4. The cable fixation system according to claim 1, wherein the cable strip comprises a layer of one material with particles of a second material.

5. The cable fixation system according to claim 1, wherein the cable strip is UV resistant and/or is flame retardant.

6. A low voltage, medium voltage or high voltage cable fixation system, comprising:

a cable strip; and a cable rack;

wherein the cable rack is configured to be mounted to a cable compartment of a low voltage, medium voltage, or high voltage switchgear;

wherein the cable rack comprises a plurality of holes;

wherein a first end of the cable strip is configured to connect to the cable rack via a hole of the plurality of holes of the cable rack;

wherein a second end of the cable strip is configured to connect to the cable rack via a hole of the plurality of holes of the cable rack;

wherein the cable strip is configured to fix or clamp a cable of the low voltage, medium voltage, or high voltage switchgear, and wherein to fix or clamp the cable: the first end of the cable strip is connected to the cable rack via a first hole of the plurality of holes of the cable rack, the second end of the cable strip is connected to the cable rack via a second hole of the plurality of holes of the cable rack, and the cable strip loops round at least a part of the cable; wherein the first end of the cable strip is connected to the second end of the cable strip and wherein the first end of the cable strip is connected to the cable rack via a bolt or screw through the first hole of the plurality of holes of the cable rack.

7. The cable fixation system according to claim 6, wherein the second end of the cable strip is connected to the cable rack via the bolt or screw through the first hole of the plurality of holes of the cable rack.

8. The cable fixation system according to claim 6, wherein the first hole of the plurality of holes of the cable rack is threaded, and wherein the second hole of the plurality of holes of the cable rack is threaded.

9. The cable fixation system according to claim 6, wherein the first end of the cable strip is connected to the cable rack via the bolt through the first hole of the plurality of holes of the cable rack from one side and a nut from the other side and wherein the second end of the cable strip is connected to the cable rack via the bolt or screw through the first hole of the plurality of holes of the cable rack from one side and the nut from the other side.

10. The cable fixation system according to claim 6, wherein the cable strip has a mechanical strength of at least 1 kN.

11. The cable fixation system according to claim 6, wherein the cable strip comprises thermoset, thermoplastic, or a rubber material.

12. The cable fixation system according to claim 6, wherein the cable strip comprises a metallic material.

* * * * *